(12) United States Patent
Shimokawa et al.

(10) Patent No.: US 11,909,259 B2
(45) Date of Patent: Feb. 20, 2024

(54) STATOR, MOTOR, FAN, AIR CONDITIONER, AND METHOD FOR MANUFACTURING STATOR

(71) Applicant: Mitsubishi Electric Corporation, Tokyo (JP)

(72) Inventors: Takaya Shimokawa, Tokyo (JP); Hiroki Aso, Tokyo (JP); Ryogo Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 552 days.

(21) Appl. No.: 17/256,574

(22) PCT Filed: Aug. 28, 2018

(86) PCT No.: PCT/JP2018/031647
§ 371 (c)(1),
(2) Date: Dec. 28, 2020

(87) PCT Pub. No.: WO2020/044420
PCT Pub. Date: Mar. 5, 2020

(65) Prior Publication Data
US 2021/0126495 A1    Apr. 29, 2021

(51) Int. Cl.
*H02K 1/12*    (2006.01)
*H02K 1/14*    (2006.01)
(Continued)

(52) U.S. Cl.
CPC ............ *H02K 1/146* (2013.01); *F04D 25/06* (2013.01); *F24F 1/0018* (2013.01); *H02K 1/148* (2013.01);
(Continued)

(58) Field of Classification Search
CPC .............................................. H02K 1/146–148
See application file for complete search history.

(56) References Cited

U.S. PATENT DOCUMENTS

2003/0222531 A1*  12/2003  Akutsu ............... G01D 5/2046
                                                    310/216.074
2019/0036385 A1   1/2019  Oikawa et al.

FOREIGN PATENT DOCUMENTS

JP    2003329486 A    11/2003
JP    2008131679 A     6/2008
(Continued)

OTHER PUBLICATIONS

Office Action dated Sep. 7, 2021, issued in corresponding JP Patent Application No. 2020-539886 (and English Machine Translation).
(Continued)

*Primary Examiner* — Thomas Fink
(74) *Attorney, Agent, or Firm* — POSZ LAW GROUP, PLC

(57) ABSTRACT

A stator includes a first core that includes a first tooth extending in a first radial direction and a first core back extending in a circumferential direction and a second core that includes a second tooth extending in a second radial direction and a second core back extending in the circumferential direction. The first core back includes a depression formed with at least a first face and a second face in an outer peripheral surface of the first core back and a connection part facing the second core back. The stator satisfies θ1<θ2, where θ1 represents an angle between the first face and the first radial direction and θ2 represents an angle between the second face and the first radial direction.

11 Claims, 12 Drawing Sheets

(51) Int. Cl.
*F04D 25/06* (2006.01)
*F24F 1/0018* (2019.01)
*H02K 7/14* (2006.01)
*H02K 15/02* (2006.01)
*H02K 21/16* (2006.01)

(52) U.S. Cl.
CPC .............. *H02K 7/14* (2013.01); *H02K 15/022* (2013.01); *H02K 21/16* (2013.01); *H02K 2213/03* (2013.01)

(56) References Cited

FOREIGN PATENT DOCUMENTS

| | | | |
|---|---|---|---|
| JP | 2008301615 | A | 12/2008 |
| JP | 2013005702 | A | 1/2013 |
| JP | 2017085827 | A | 5/2017 |
| WO | 2017-085827 | A1 | 5/2017 |
| WO | 2017175664 | A | 10/2017 |
| WO | 2017183162 | A | 10/2017 |

OTHER PUBLICATIONS

International Search Report of the International Searching Authority dated Nov. 6, 2018 for the corresponding International application No. PCT/JP2018/031647 (and English translation).

* cited by examiner

STATOR, MOTOR, FAN, AIR CONDITIONER, AND METHOD FOR MANUFACTURING STATOR

CROSS REFERENCE TO RELATED APPLICATION

This application is a U.S. national stage application of International Application No. PCT/JP2018/031647 filed on Aug. 28, 2018, the contents of which are incorporated herein by reference.

TECHNICAL FIELD

The present invention relates to a stator of a motor.

BACKGROUND

A stator including a plurality of cores connected together at their core backs (referred to also as yokes or back yokes) is commonly used. In the manufacturing process of such a stator, the plurality of cores are arranged annularly, and cores at both ends in a state of contacting each other are welded together (e.g., Patent Reference 1, for example).

PATENT REFERENCE

Patent Reference 1: Japanese Patent Application Publication No. 2008-301615

Normally, the plurality of cores are arranged annularly by pressing the plurality of cores by using jigs. For example, in the case where a convex part is formed in an outer peripheral surface of each of the cores at both ends among the plurality of cores, arranging the plurality of cores annularly is facilitated by pushing the convex parts with jigs. However, in the case where the convex parts are formed in the outer peripheral surfaces of cores, the outer diameter of the stator core increases, and thus it is necessary to previously design the outer diameter of the stator core at a smaller value. However, motor efficiency drops as the outer diameter of the stator core decreases.

SUMMARY

An object of the present invention is to provide a stator that facilitates the process of arranging the plurality of cores annularly and is capable of preventing the drop in the motor efficiency.

A stator according to the present invention includes a first core that includes a first tooth extending in a first radial direction and a first core back extending in a circumferential direction and a second core that includes a second tooth extending in a second radial direction and a second core back extending in the circumferential direction and connects with the first core. The first core back includes a depression formed with at least a first face and a second face in an outer peripheral surface of the first core back and a connection part facing the second core back. The stator satisfies $\theta1<\theta2$ and $\alpha1 \leq \theta1<90$ degrees, where $\theta1$ represents an angle between the first face and the first radial direction in a plane perpendicular to an axial direction, $\theta2$ represents an angle between the second face and the first radial direction in the plane, and $\alpha1$ (degrees) represents an angle between the connection part and the first radial direction in the plane.

According to the present invention, a stator facilitating the process of arranging the plurality of cores annularly and capable of preventing the drop in the motor efficiency can be provided.

DETAILED DESCRIPTION

First Embodiment

In an xyz orthogonal coordinate system shown in each drawing, a z-axis direction (z-axis) represents a direction parallel to an axis line Ax of a motor 1, an x-axis direction (x-axis) represents a direction orthogonal to the z-axis direction (z-axis), and a y-axis direction (y-axis) represents a direction orthogonal to both of the z-axis direction and the x-axis direction. The axis line Ax is the center of rotation of a rotor 2. A direction parallel to the axis line Ax is referred to also as an "axial direction of the rotor 2" or simply as an "axial direction". A radial direction is a direction orthogonal to the axis line Ax. An xy plane is a plane perpendicular to the axial direction.

Figure 1:
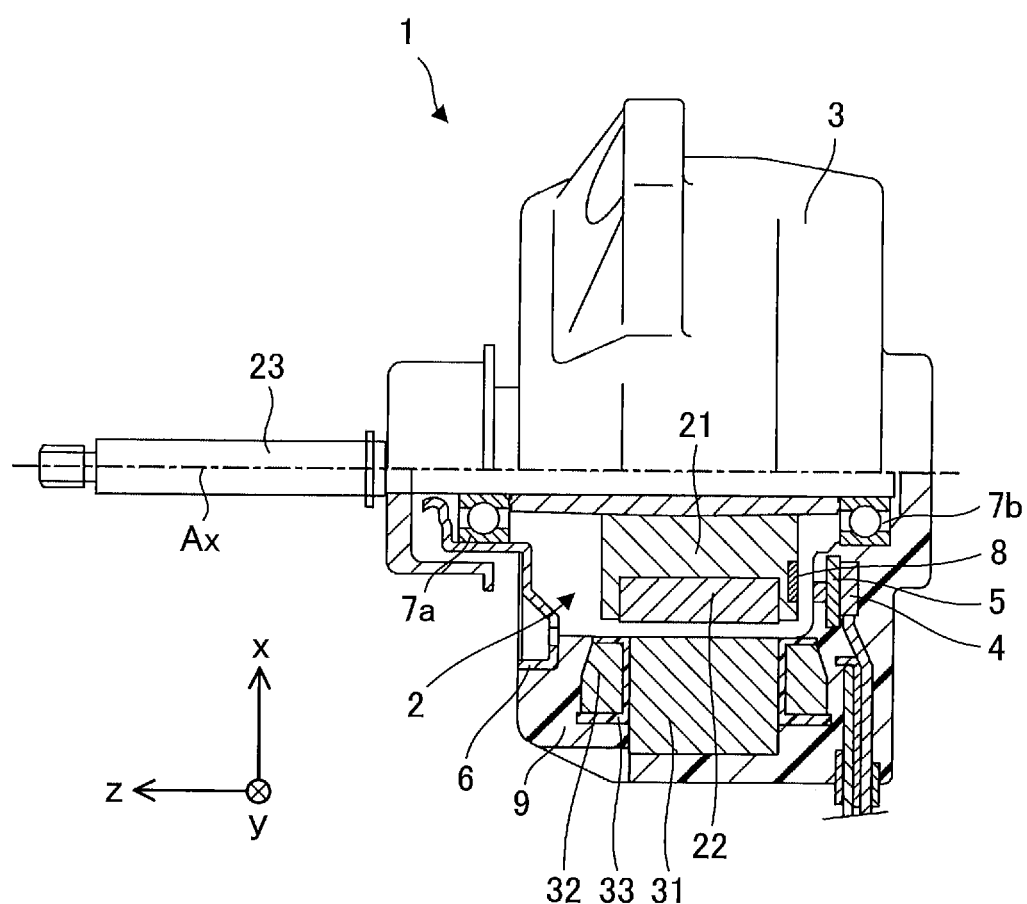
FIG. 1 is a partial cross-sectional view schematically showing the structure of a motor according to a first embodiment of the present invention.

FIG. 1 is a partial cross-sectional view schematically showing the structure of the motor 1 according to a first embodiment of the present invention. An arrow D1 indicates a circumferential direction of a stator 3 around the axis line Ax.

The motor 1 includes the rotor 2, the stator 3, a circuit board 4, a magnetic sensor 5 for detecting a rotational position of the rotor 2, a bracket 6, bearings 7a and 7b, and a sensor magnet 8 as a magnet for detecting the position of the rotor 2.

The motor 1 is, for example, a permanent magnet synchronous motor (referred to also as a brushless DC motor) such as a permanent magnet embedded motor.

The bearings 7a and 7b rotatably support the rotor 2.

The rotor 2 is rotatably disposed inside the stator 3. An air gap is formed between the rotor 2 and the stator 3. The rotor 2 rotates around the axis line Ax. The rotor 2 includes a rotor core 21, at least one permanent magnet 22 as a main magnet, and a shaft 23.

The rotor core 21 is longer than a stator core 31 in the axial direction. This configuration has an advantage in that magnetic flux from the rotor 2 is likely to flow also into both ends of the rotor core in regard to the axial direction.

The rotor core 21 is formed with a plurality of electromagnetic steel sheets. Each electromagnetic steel sheet has a thickness of 0.2 mm to 0.5 mm, for example. The electromagnetic steel sheets are stacked in the axial direction.

However, the rotor core 21 may also be a resin core formed by mixing soft magnetic material and resin together instead of stacking a plurality of electromagnetic steel sheets. The rotor core 21 functions as a back yoke in the rotor 2.

The permanent magnet 22 is a rare-earth magnet containing neodymium, a rare-earth magnet containing samarium, or a ferrite magnet containing iron, for example.

In the example shown in FIG. 1, the rotor 2 is an SPM (Surface Permanent Magnet) rotor. Namely, a plurality of permanent magnets 22 are attached to an outer peripheral surface of the rotor core 21. Each permanent magnet 22 has been magnetized in the radial direction. Accordingly, magnetic flux from the permanent magnet 22 flows into the stator core 31.

It is also possible to use an IPM (Interior Permanent Magnet) rotor as the rotor 2 instead of the SPM rotor. In the rotor 2 as the IPM rotor, the permanent magnet 22 as the main magnet is inserted in each of a plurality of magnet insertion holes formed in the rotor core 21.

The shaft 23 is inserted in a hole formed in a central part of the rotor core 21, for example.

The shaft 23 is integrated with the rotor core 21 by means of caulking or a resin such as polybutylene terephthalate (PBT). It is also possible to fix the shaft 23 to the rotor core 21 by means of press fitting or shrink fitting.

The circuit board 4 is provided on a side of the stator 3 at one end in the axial direction. Electronic components such as a control circuit and the magnetic sensor 5 are attached to the circuit board 4. The magnetic sensor 5 detects the rotational position of the rotor 2 by detecting the rotational position of the sensor magnet 8. The sensor magnet 8 is attached to the rotor 2 so as to face the magnetic sensor 5. The sensor magnet 8 is disk-shaped. The sensor magnet 8 rotates together with the rotor 2.

The sensor magnet 8 indicates the rotational position of the rotor 2. The sensor magnet 8 is fixed to a side of the rotor 2 at one end in the axial direction so as to face the magnetic sensor 5.

The sensor magnet 8 has been magnetized in the axial direction so that its magnetic flux flows into the magnetic sensor 5. Accordingly, the magnetic sensor 5 can be attached to a side of the stator 3 at one end in the axial direction so as to face the sensor magnet 8. However, the direction of the magnetic flux from the sensor magnet 8 is not limited to the axial direction.

The number of magnetic poles of the sensor magnet 8 is the same as the number of magnetic poles of the rotor 2. The sensor magnet 8 is positioned so that the polarity of the sensor magnet 8 coincides with the polarity of the rotor 2 in regard to the circumferential direction.

The magnetic sensor 5 detects the rotational position of the rotor 2 by detecting the rotational position of the sensor magnet 8. For example, a Hall IC, an MR (magnetoresistance) element, a GMR (giant magnetoresistance) element, a magneto-impedance element, or the like is used for the magnetic sensor 5.

The magnetic sensor 5 is fixed at a position where magnetic flux emitted from the sensor magnet 8 flows (detection position).

The magnetic sensor 5 detects the positions of the magnetic poles of the sensor magnet 8 and the rotor 2 based on the change in the magnetic field flowing into the magnetic sensor 5 (specifically, magnetic field intensity). Specifically, the magnetic sensor 5 determines timing at which the direction of the magnetic field changes in the circumferential direction (i.e., rotation direction) of the sensor magnet 8 (specifically, the magnetic pole switching points of the sensor magnet 8) by detecting magnetic flux from a north pole of the sensor magnet 8 and magnetic flux heading towards a south pole of the sensor magnet 8. Since the sensor magnet 8 has north poles and south poles alternately arranged in the circumferential direction, the positions of the magnetic poles in the rotation direction (e.g., the rotation angle of the rotor 2) can be grasped by the periodical detection of the magnetic pole switching points of the sensor magnet 8 by the magnetic sensor 5.

The control circuit attached to the circuit board 4 controls the rotation of the rotor 2 by controlling electric current flowing through a coil 32 of the stator 3 by using the result of the detection by the magnetic sensor 5 (e.g., the magnetic pole switching point as a boundary between a north pole and a south pole of the sensor magnet 8).

However, it is also possible for the motor 1 to control the rotation of the rotor 2 without using the magnetic sensor 5 and the sensor magnet 8. Namely, the rotation of the rotor 2 may be controlled by means of sensorless control. In the sensorless control, the rotation of the rotor 2 is controlled by controlling current and voltage supplied to the coil 32 without using the magnetic sensor 5 and the sensor magnet 8.

Figure 2:
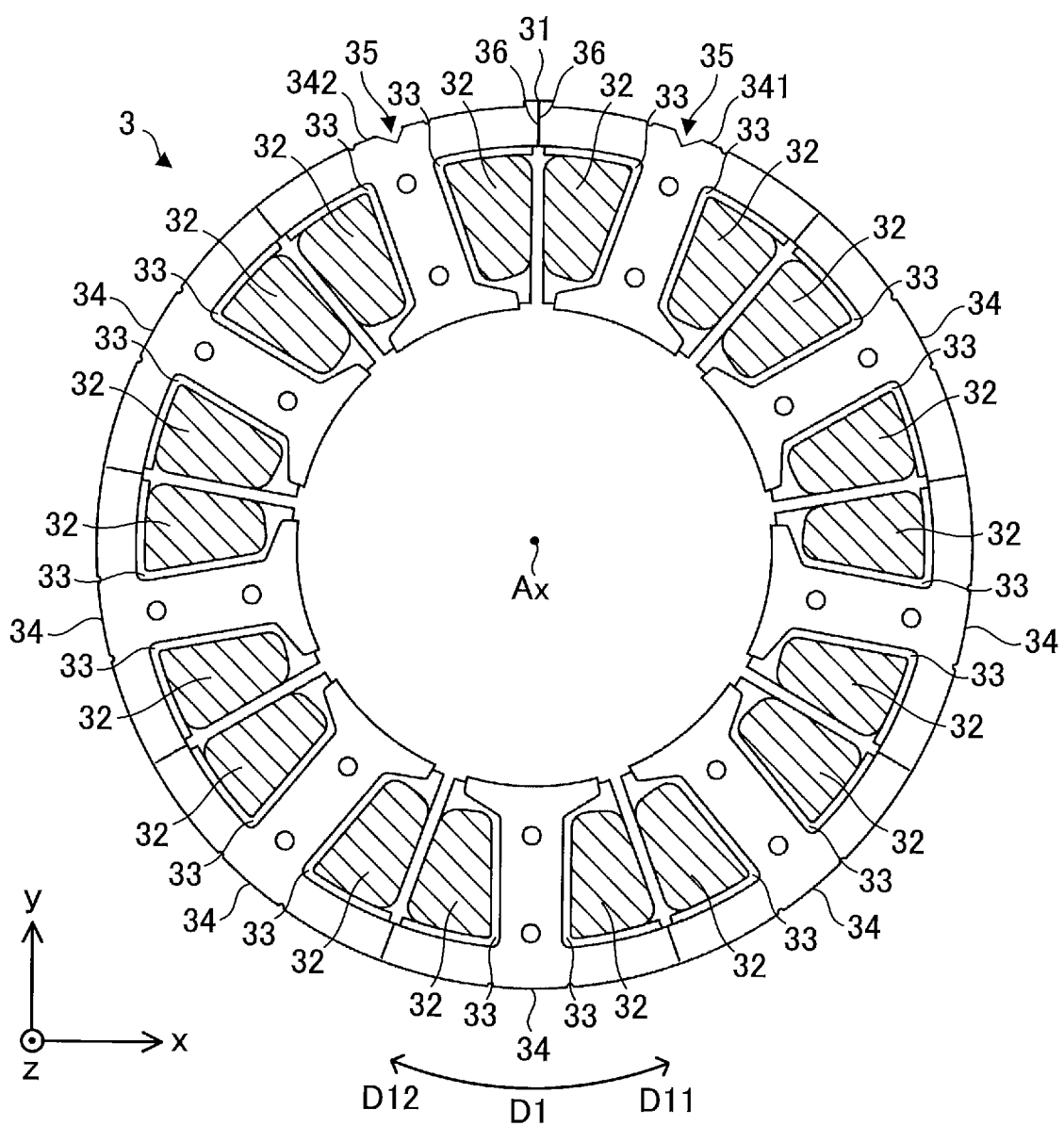
FIG. 2 is a diagram schematically showing the structure of a stator.

FIG. 2 is a diagram schematically showing the structure of the stator 3. The arrow D1 also indicates a circumferential direction of the rotor 2 around the axis line Ax. The circumferential direction of the rotor 2 or the stator 3 will also be referred to simply as a "circumferential direction". For example, the arrow D11 in the arrow represented as D1 indicates the rotation direction of the rotor 2. The arrow D12 in the arrow represented as D1 indicates a direction opposite to the rotation direction of the rotor 2.

The stator 3 includes the stator core 31, the coil 32 and an insulator 33.

The stator core 31 is formed by, for example, stacking a plurality of electromagnetic steel sheets. The thickness of each electromagnetic steel sheet is 0.2 mm to 0.5 mm, for example.

The stator core 31 is formed annularly.

Specifically, the stator core 31 includes a plurality of cores 34. The plurality of cores 34 include a first core 341 and a second core 342. Each core 34 is formed by stacking a plurality of electromagnetic steel sheets as mentioned above. In the example shown in FIG. 2, the stator core 31 includes nine cores 34.

The coil 32 is formed by, for example, winding a winding (e.g., magnet wire) around teeth 34b of the stator core 31 via the insulator 33. The coil 32 (i.e., winding) is formed of material containing copper or aluminum, for example. The coil 32 is insulated by the insulator 33.

The insulator 33 is formed of resin having an insulating property, such as polybutylene terephthalate (PBT), polyphenylene sulfide (PPS), liquid crystal polymer (LCP) or polyethylene terephthalate (PET). The insulator 33 can be a film having a thickness of 0.035 mm to 0.4 mm, for example.

For example, the insulator 33 is formed integrally with the stator core 31. However, the insulator 33 may also be formed separately from the stator core 31. In this case, the insulator 33 after being formed is fit in the stator core 31.

In this embodiment, the stator core 31, the coil 32 and the insulator 33 are covered by a resin 9 such as unsaturated polyester resin (e.g., bulk molding compound (BMC)) or epoxy resin. For example, the resin 9 is thermosetting resin and is formed of a nonmagnetic material.

The stator core 31, the coil 32 and the insulator 33 may be fixed by a cylindrical shell instead of the resin 9. The cylindrical shell is formed of material containing iron, for example. In this case, the cylindrical shell is capable of covering the stator 3 together with the rotor 2 by means of shrink fitting.

The structure of the core 34 will be described concretely below.

Figure 3:
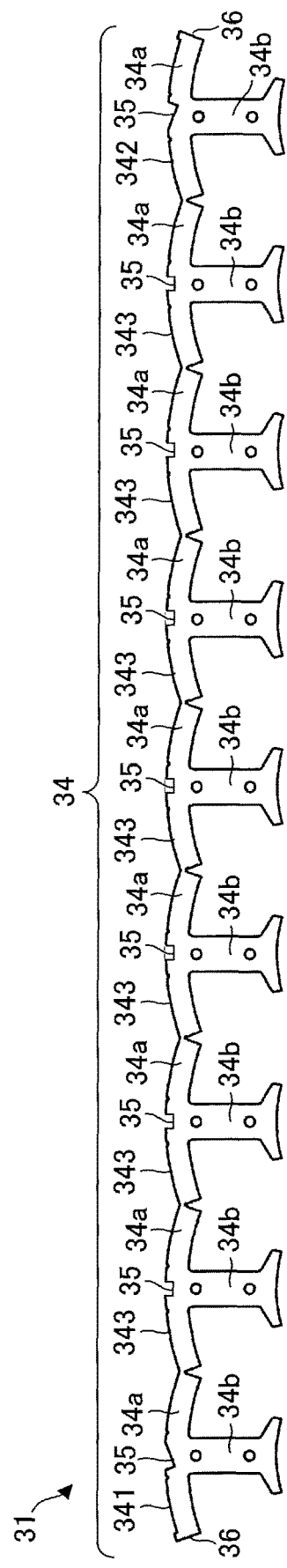
FIG. 3 is a diagram schematically showing the structure of each core in a plane perpendicular to an axial direction.

FIG. 3 is a diagram schematically showing the structure of each core 34 in a plane perpendicular to the axial direction. The stator core 31 is formed with the plurality of cores 34 shown in FIG. 3. FIG. 3 shows the plurality of cores 34 before assembling the stator core 31. Namely, FIG. 3 shows the plurality of cores 34 arranged linearly.

The core 34 at the left end of the plurality of cores 34 shown in FIG. 3 is defined as the first core 341, the core 34 at the right end of the plurality of cores 34 shown in FIG. 3 is defined as the second core 342, and cores other than the cores 341 and 342 are defined as cores 343. Thus, a plurality of third cores 343 are arranged between the first core 341 and the second core 342.

Each core 34 includes a core back 34a and a tooth 34b. The core back 34a extends in the circumferential direction. The tooth 34b extends in the radial direction. In other words, the tooth 34b extends from the core back 34a towards a rotation center of the rotor 2 (FIG. 2).

In the plurality of cores 34 shown in FIG. 3, cores 34 adjacent to each other are connected to each other at their core backs 34a.

Figure 4:
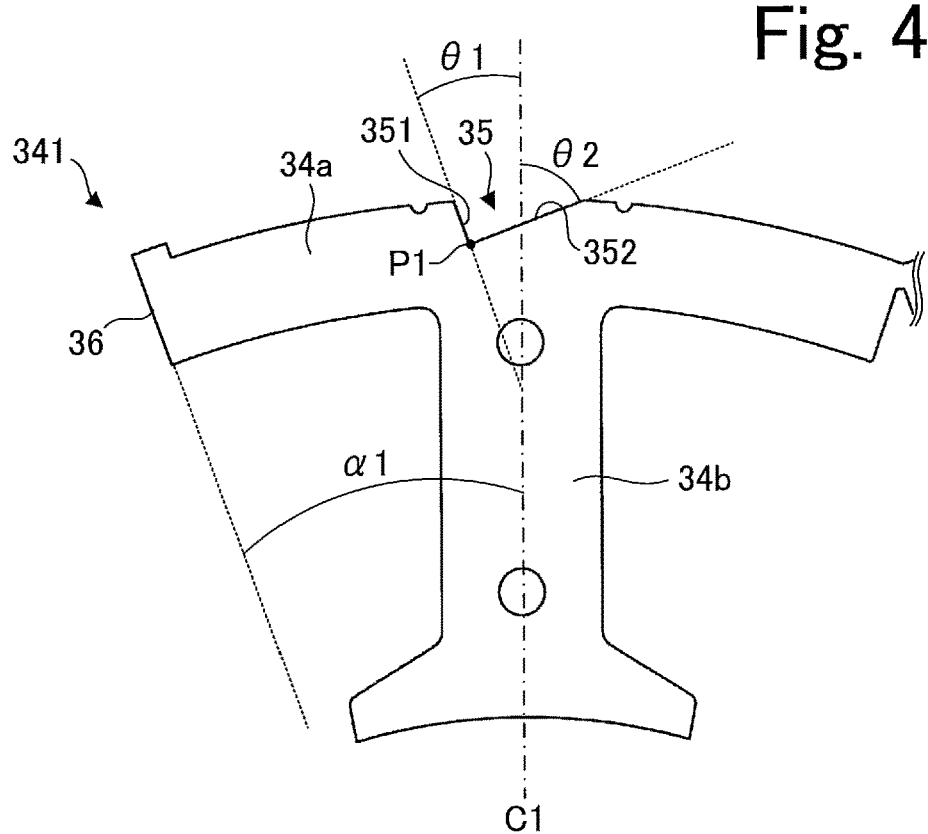
FIG. 4 is a diagram schematically showing the structure of a first core shown in FIG. 3.

FIG. 4 is a diagram schematically showing the structure of the first core 341 shown in FIG. 3.

The first core 341 includes the core back 34a as a first core back and the tooth 34b as a first tooth. In the first core 341, the core back 34a extends in the circumferential direction as mentioned above. In the first core 341, the tooth 34b extends in the radial direction (referred to also as a "first radial direction" in FIG. 4) as mentioned above.

The core back 34a of the first core 341 will hereinafter be referred to also as a "first core back 34a". Similarly, the tooth 34b of the first core 341 will hereinafter be referred to also as a "first tooth 34b".

A straight line C1 is a straight line that passes through a center of the first tooth 34b in the plane perpendicular to the axial direction. The straight line C1 also indicates the first radial direction. Namely, the straight line C1 is parallel to the first radial direction. The straight line C1 is referred to also as a tooth center line or a first tooth center line.

The first core back 34a includes a depression 35 as a first depression and a connection part 36. With this configuration, when the plurality of cores 34 are arranged annularly, the depression 35 of the first core back 34a can be pushed inward in the radial direction and in the circumferential direction by using a jig. Consequently, the process of arranging the plurality of cores 34 is facilitated.

The depression 35 of the first core back 34a is formed with at least a first face 351 and a second face 352 in an outer peripheral surface of the first core back 34a. Specifically, in the example shown in FIG. 4, the depression 35 is formed with two faces.

The first face 351 is formed on the connection part 36's side in the first core back 34a in the plane perpendicular to the axial direction. The second face 352 is formed at a position including the center of the tooth 34b in the plane perpendicular to the axial direction. In other words, the second face 352 is formed at a position where the straight line C1 passes in the plane perpendicular to the axial direction.

After the assembly of the stator core 31, the connection part 36 of the first core back 34a faces the core back 34a of the second core 342 as a second core back and is connected to the second core 342.

The stator 3 satisfies $\theta 1 < \theta 2$, where $\theta 1$ (degrees) represents an angle between the first face 351 and the first radial direction in the plane perpendicular to the axial direction (i.e., in FIG. 4) and $\theta 2$ (degrees) represents an angle between the second face 352 and the first radial direction in the plane perpendicular to the axial direction (i.e., in FIG. 4).

Further, the stator 3 satisfies $\alpha 1 \leq \theta 1 < 90$ degrees, where $\alpha 1$ (degrees) represents an angle between the connection part 36 and the first radial direction in the plane perpendicular to the axial direction.

The angle $\alpha 1$ is $360/2n$ degrees, where n represents the number of the plurality of teeth 34b in the stator 3.

Furthermore, the stator 3 is desired to satisfy $\theta 1 + \theta 2 = 90$ degrees. Namely, an angle between the first face 351 and second face 352 is desired to be 90 degrees in the plane perpendicular to the axial direction.

In the plane perpendicular to the axial direction, an intersection point P1 of an extension line of the first face 351 and an extension line of the second face 352 is deviated from the center of the first tooth 34b in a direction perpendicular to the first radial direction. In the example shown in FIG. 4, the intersection point P1 is situated on the left side (i.e., the connection part 36's side) of the center of the first tooth 34b. In the example shown in FIG. 4, the depression 35 is formed with two faces, and thus the intersection point P1 is a boundary between the first face 351 and the second face 352.

Figure 5:
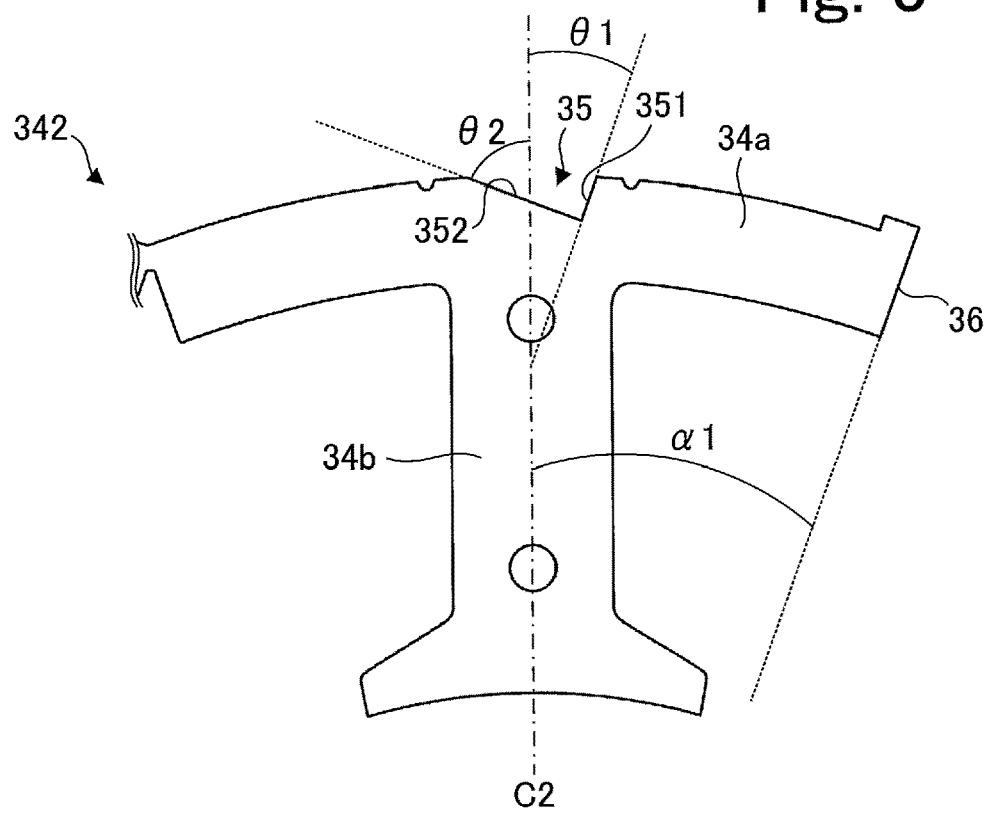
FIG. 5 is a diagram schematically showing the structure of a second core shown in FIG. 3.

FIG. 5 is a diagram schematically showing the structure of the second core 342 shown in FIG. 3.

The second core 342 includes the core back 34a as a second core back and the tooth 34b as a second tooth. In the second core 342, the core back 34a extends in the circumferential direction as mentioned earlier. In the second core 342, the tooth 34b extends in the radial direction (referred to also as a "second radial direction" in FIG. 5) as mentioned earlier.

The core back 34a of the second core 342 will hereinafter be referred to also as a "second core back 34a". Similarly, the tooth 34b of the second core 342 will hereinafter be referred to also as a "second tooth 34b".

A straight line C2 is a straight line that passes through a center of the second tooth 34b on the plane perpendicular to the axial direction. The straight line C2 also indicates the second radial direction. Namely, the straight line C2 is parallel to the second radial direction. The straight line C2 is referred to also as a tooth center line or a second tooth center line.

The second core back 34a includes a depression 35 as a second depression and a connection part 36. With this configuration, when the plurality of cores 34 are arranged annularly, the depression 35 of the second core back 34a can be pushed inward in the radial direction and in the circumferential direction by using a jig. Consequently, the process of arranging the plurality of cores 34 is facilitated.

Similarly to the depression 35 of the first core back 34a, the depression 35 of the second core back 34a is formed with at least a first face 351 and a second face 352 in an outer peripheral surface of the second core back 34a. Specifically, in the example shown in FIG. 5, the depression 35 is formed with two faces.

As shown in FIG. 5, the first face 351 is formed on the connection part 36's side in the core back 34a in the plane perpendicular to the axial direction. The second face 352 is formed at a position including the center of the tooth 34b in the plane perpendicular to the axial direction. In other words, the second face 352 is formed at a position where the straight line C2 passes in the plane perpendicular to the axial direction.

After the assembly of the stator core 31, the connection part 36 of the second core back 34a faces the first core back 34a of the first core 341 and is connected to the first core 341. Therefore, in the stator 3 as a finished product, the second core 342 connects with the first core 341 as shown in FIG. 2.

As shown in FIG. 3, each third core 343 includes the core back 34a as a third core back and the tooth 34b as a third tooth. In each third core 343, the core back 34a extends in the circumferential direction as mentioned earlier and the tooth 34b extends in the radial direction (referred to also as a "third radial direction"). In the example shown in FIG. 3, the core back 34a of each third core 343 includes a depression 35 as a third depression. In each third core 343, the depression 35 is formed with at least three faces in an outer peripheral surface of the core back 34a. However, the stator core 31 may include a third core 343 having no depression 35.

In this embodiment, on the plane perpendicular to the axial direction, the depression 35 of each third core 343 is formed with three faces and is in a rectangular shape.

Each depression 35 in the stator 3 is desired to be filled in with the resin 9. This can increase rigidity of the stator core 31. Consequently, noise during the driving by the motor 1 can be reduced.

Figure 6:
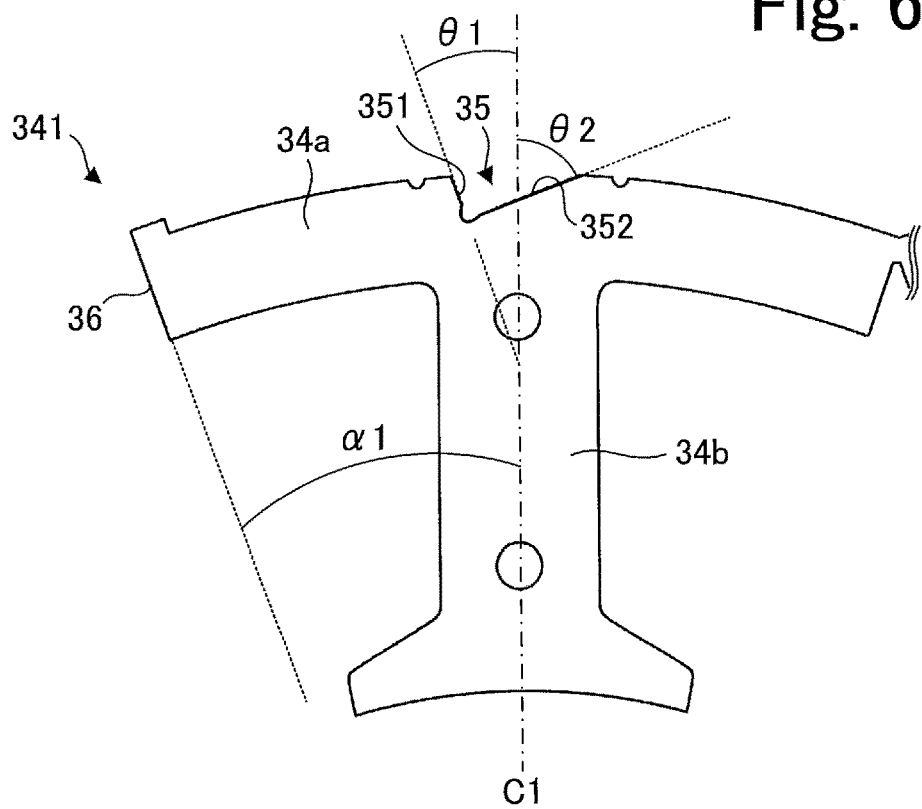
FIG. 6 is a diagram showing another example of a depression.

FIG. 6 is a diagram showing another example of the depression 35.

As shown in FIG. 6, in the plane perpendicular to the axial direction, the boundary between the first face 351 and the second face 352 may also be arc-shaped. The depression 35 shown in FIG. 6 may be used also as the depression 35 of the second core 342.

Figure 7:
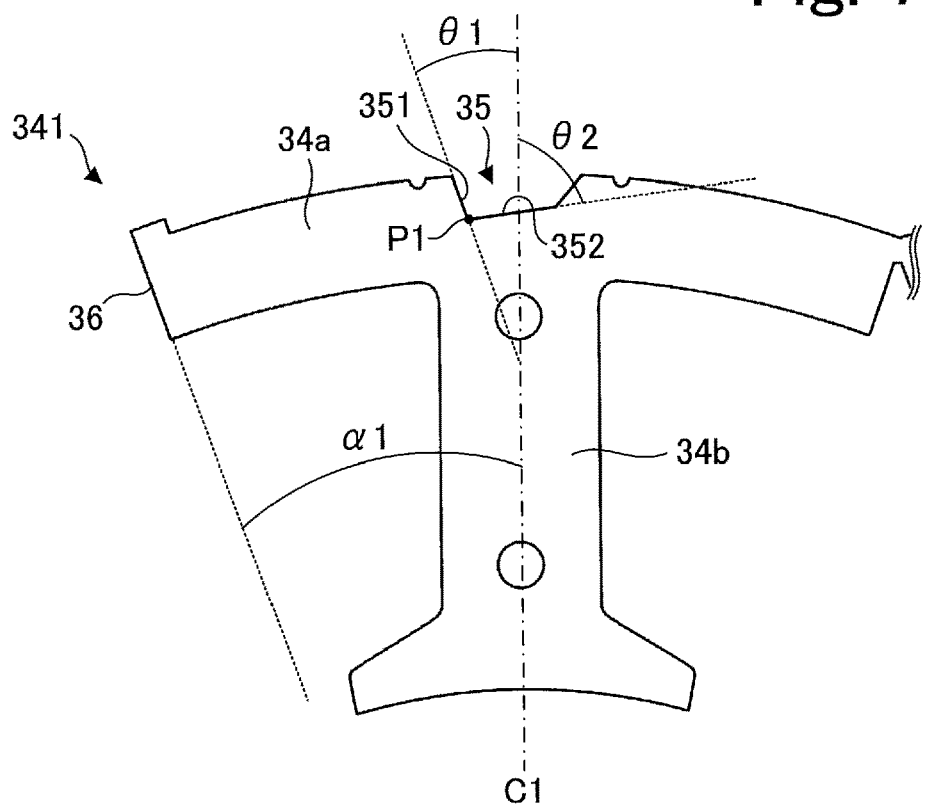
FIG. 7 is a diagram showing still another example of the depression of the first core.

FIG. 7 is a diagram showing still another example of the depression 35 of the first core 341.

Figure 8:
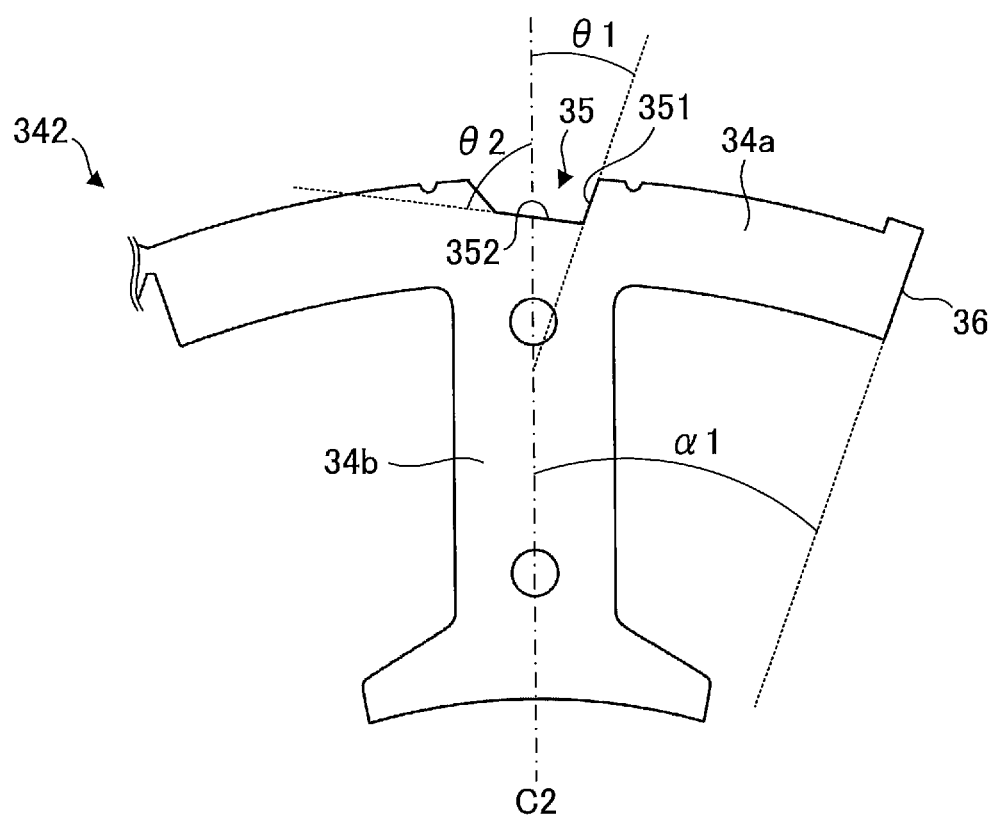
FIG. 8 is a diagram showing still another example of the depression of the second core.

FIG. 8 is a diagram showing still another example of the depression 35 of the second core 342.

As shown in FIG. 7, in the plane perpendicular to the axial direction, the depression 35 of the first core 341 may be formed with three faces. Similarly, as shown in FIG. 8, in the plane perpendicular to the axial direction, the depression 35 of the second core 342 may be formed with three faces.

A method for manufacturing the stator 3 will be described below.

Figure 9:
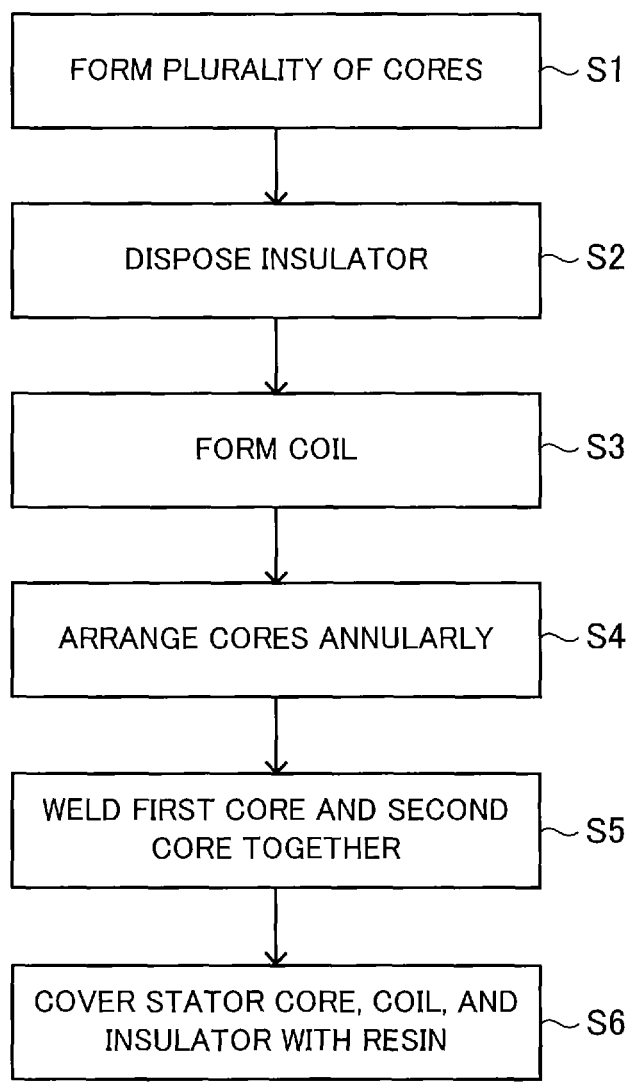
FIG. 9 is a flowchart showing an example of a method for manufacturing the stator.

FIG. 9 is a flowchart showing an example of the method for manufacturing the stator 3.

In step S1, the plurality of cores 34 are formed. For example, electromagnetic steel sheets are punched out into a shape having the aforementioned structure of the stator core 31 by using a pressing machine. By this step, the plurality of cores 34 are formed so as to have the depression 35 as the first depression 35 formed with at least two faces in the outer peripheral surface of the core back 34a of the first core 341 at one end of the plurality of cores 34 and the depression 35 as the second depression 35 formed with at least two faces in the outer peripheral surface of the core back 34a of the second core 342 at the other end of the plurality of cores 34. As a result, the stator core 31 shown in FIG. 3 is formed, that is, the plurality of cores 34 connected together at the core backs 34a are formed. As mentioned earlier, each core 34 includes the core back 34a and the tooth 34b extending from the core back 34a.

Figure 10:
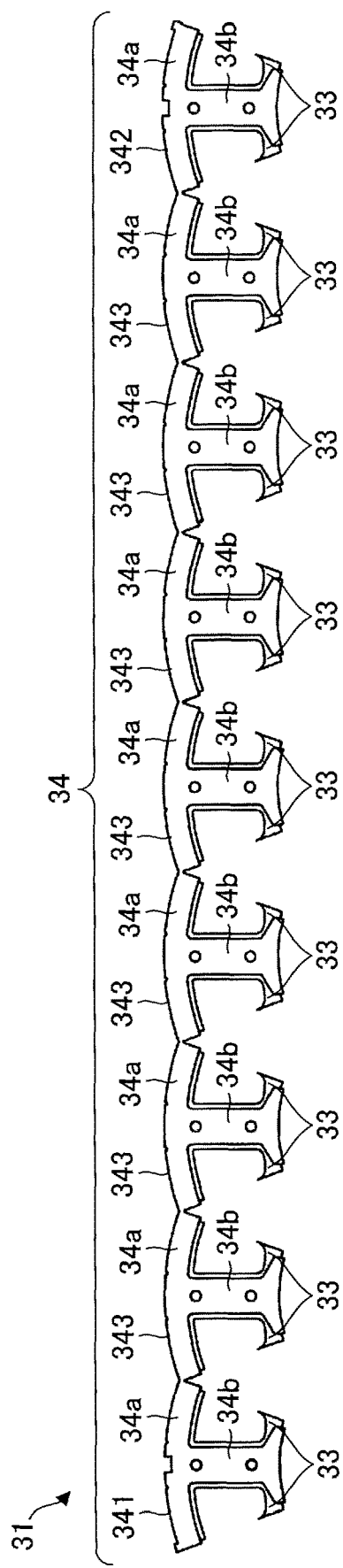
FIG. 10 is a diagram showing an example of a process of arranging an insulator on each core.

FIG. 10 is a diagram showing an example of a process of disposing the insulator 33 on each core 34.

In step S2, the insulator 33 prepared previously is disposed on each core 34. Specifically, as shown in FIG. 10, the insulator 33 is disposed around the tooth 34b of each of the plurality of cores 34.

Figure 11:
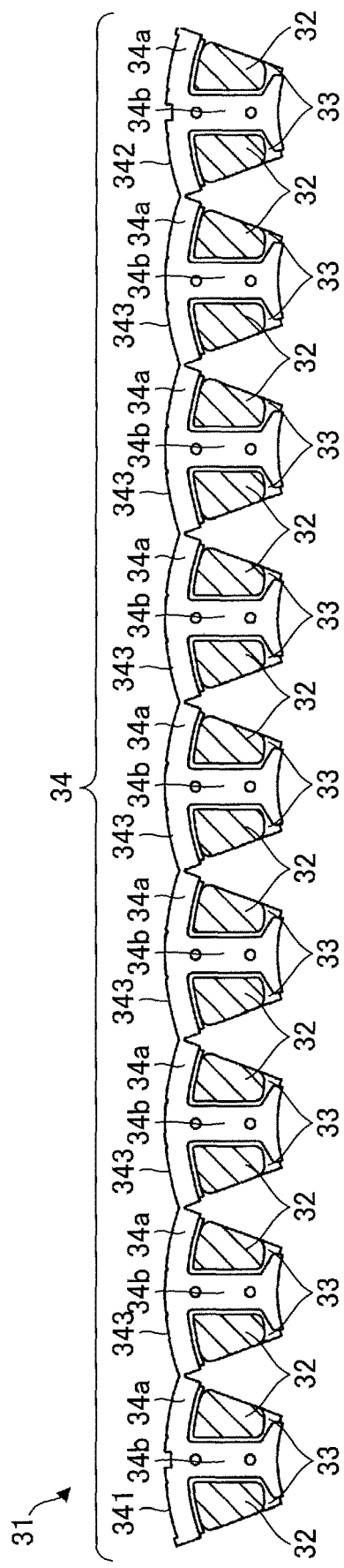
FIG. 11 is a diagram showing an example of a process of forming a coil.

FIG. 11 is a diagram showing an example of a process of forming the coil 32. FIG. 11 shows a cross section of the coil 32.

In step S3, the coil 32 is formed. Specifically, a winding is wound around the insulator 33 by using a coil winding machine. By this step, the coil 32 is formed as shown in FIG. 11.

Figure 12:
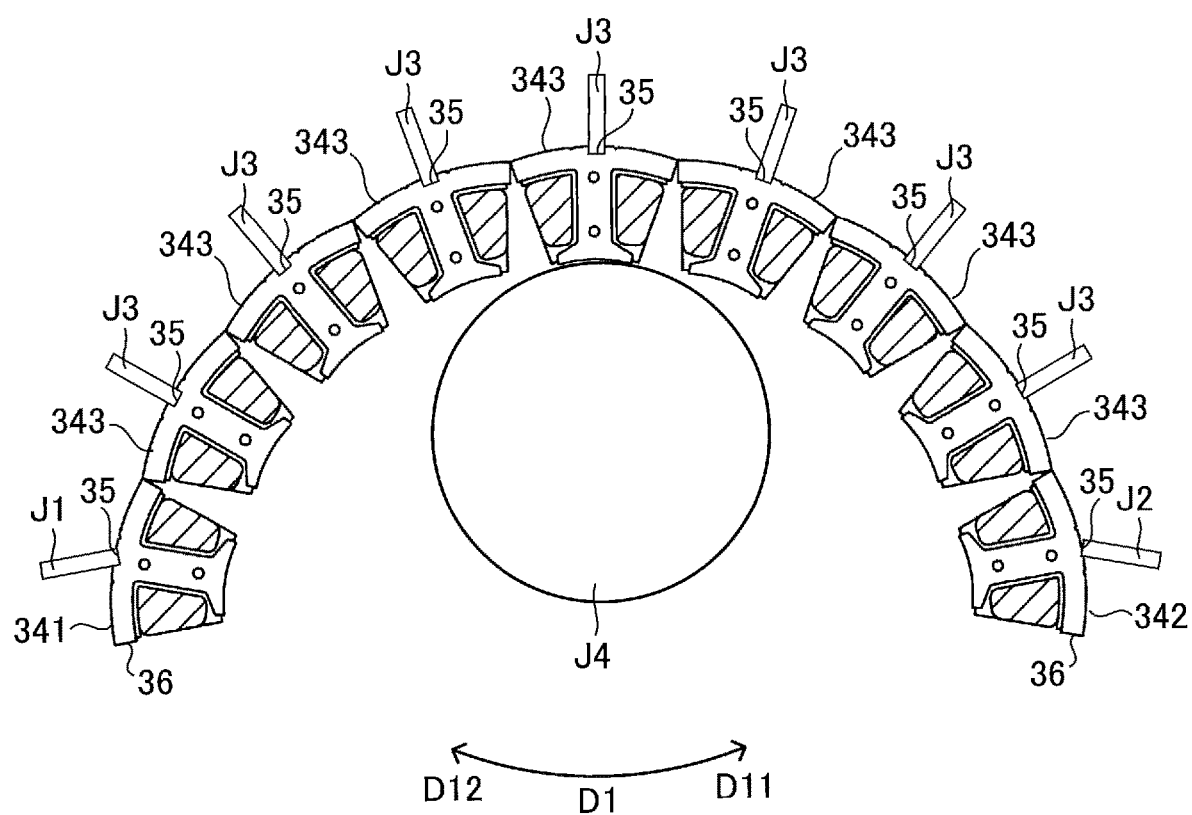
FIG. 12 is a diagram showing an example of a process of arranging a plurality of cores annularly.

FIG. 12 is a diagram showing an example of a process of arranging the plurality of cores 34 annularly.

In step S4, the plurality of cores 34 are arranged annularly. Specifically, the plurality of cores 34 are arranged annularly by pushing the depression 35 as the first depression 35 in a first circumferential direction D11 by using a first jig J1 while pushing the depression 35 as the second depression 35 in a second circumferential direction D12 by using a second jig J2, and the connection part 36 of the first core back 34a is placed in contact with the connection part 36 of the second core back 34a. In this case, the plurality of cores 34 are arranged to be wound around a previously prepared core bar J4 as shown in FIG. 12, for example.

Further, as shown in FIG. 12, at least two third jigs J3 are respectively brought into contact with the depressions 35 of cores 343, and the cores 343 are pushed inward in the radial direction. This facilitates the arrangement of the plurality of cores 34 and increases the roundness of the stator core 31. With the increase in the roundness of the stator core 31, the noise during the driving by the motor 1 can be reduced.

The first jig J1 is in a rod-like shape, for example, and the second jig J2 is also in a rod-like shape, for example. One direction in the circumferential direction D1 is defined as the first circumferential direction D11, and the other direction in the circumferential direction D1 is defined as the second circumferential direction D12. Thus, the second circumferential direction D12 is the direction opposite to the first circumferential direction D11.

In step S5, in the state in which the first core 341 is in contact with the second core 342, the first core 341 and the second core 342 are welded together. Specifically, in the state in which the cores 343 are pushed inward in the radial direction by using the third jig J3, the first core 341 and the second core 342 are respectively pushed in the circumferential direction (namely, towards the connection part 36's side) by using the first jig J1 and the second jig J2. In the state in which the first core 341 and the second core 342 are in contact with each other, the boundary between the first core 341 and the second core 342 is welded (e.g., outer peripheral surfaces of their core backs 34a are welded together). By this step, the stator 3 shown in FIG. 2 is obtained. Further, a process in the next step S6 may be performed.

In the step S6, the stator core 31, the coil 32 and the insulator 33 are covered with the resin 9.

The stator 3 can be obtained by the process described above.

Advantages of the stator 3 will be described below.

Each core 34 includes the depression 35. With this configuration, a stator 3 facilitating the process of arranging the plurality of cores 34 annularly can be provided.

In the method of arranging the plurality of cores 34 annularly by using the first jig J1 and the second jig J2 as shown in the aforementioned step S4, in the case where the depression 35 is formed to be large in the circumferential direction and the radial direction, it is easy to push the first core 341 and the second core 342 respectively in the circumferential direction by using the first jig J1 and the second jig J2. However, with the increase in the size of the depression 35 in the circumferential direction and the radial direction, width of the core back 34a in the radial direction becomes narrower and the motor efficiency drops accordingly.

Therefore, in this embodiment, the stator 3 satisfies $\theta1<\theta2$ as mentioned earlier. With this configuration, widths of the depression 35 in the circumferential direction and the radial direction can be made short, by which the drop in the motor efficiency can be prevented.

When the stator 3 satisfies $\alpha1<\theta1<90$ degrees, pushing the first core 341 and the second core 342 inward in the radial direction and in the circumferential direction as shown in the aforementioned steps S4 and S5 is facilitated. Further, when the angle $\theta1$ equals the angle $\alpha1$ in the first core 341, strongly pushing the first face 351 in the first circumferential direction D11 with the first jig J1 becomes possible. Similarly, when the angle $\theta1$ equals the angle $\alpha1$ in the second core 342, strongly pushing the first face 351 in the second circumferential direction D12 with the second jig J2 becomes possible.

Therefore, when the stator 3 satisfies $\alpha1 \leq \theta1 < 90$ degrees, pushing the first core 341 and the second core 342 inward in the radial direction and in the circumferential direction is facilitated. Accordingly, the roundness of the stator core 31 can be increased.

Further, the stator 3 is desired to satisfy $\theta1+\theta2=90$ degrees. With this configuration, the first jig J1 having a tip end angle of 90 degrees can be used. In this case, in the aforementioned steps S4 and S5, the first jig J1 can be made to firmly contact the first face 351 and the second face 352 of the depression 35, by which the depression 35 can be strongly pushed inward in the radial direction and in the first circumferential direction D11. Similarly, the second jig J2 having a tip end angle of 90 degrees can be used, and in the aforementioned steps S4 and S5, the second jig J2 can be made to firmly contact the first face 351 and the second face 352 of the depression 35, by which the depression 35 can be strongly pushed inward in the radial direction and in the second circumferential direction D12.

For example, in the case where the intersection point P1 is situated at the center of the first tooth 34b, the width of the depression 35 in the radial direction has to be made large in order to secure a sufficient length of the first face 351 in the plane perpendicular to the axial direction. When the width of the depression 35 in the radial direction is large, the width of the core back 34a in the radial direction narrows as mentioned above and that works as a factor impeding the flow of magnetic flux.

Figure 13:
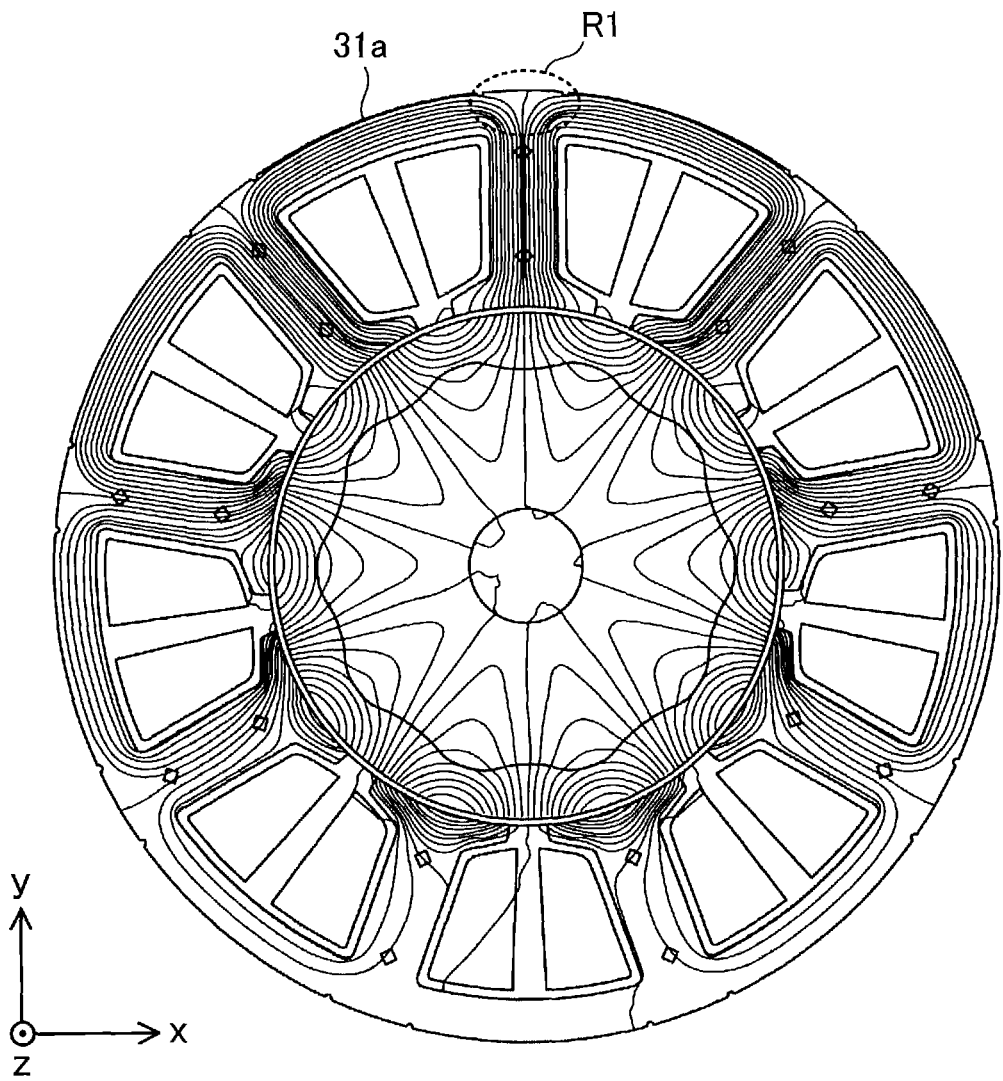
FIG. 13 is a diagram showing magnetic flux flowing into a stator core in a motor of a standard type.

FIG. 13 is a diagram showing magnetic flux flowing into a stator core 31a in a motor of a standard type.

As shown in FIG. 13, magnetic flux hardly flows in a region R1, that is, a region corresponding to the position of the depression 35. Accordingly, in this embodiment, the depression 35 does not impede the flow of magnetic flux in the stator core 31 since the depression 35 is formed at the position corresponding to the region R1.

Further, in this embodiment, in the plane perpendicular to the axial direction, the intersection point P1 of the extension line of the first face 351 and the extension line of the second face 352 is deviated from the center of the first tooth 34b in the direction perpendicular to the first radial direction. With this configuration, a sufficient length of the first face 351 can be secured in the state in which the width of the depression 35 in the radial direction is made small. Consequently, it is possible to prevent the impeding of the flow of magnetic flux and facilitate the manufacture of the stator 3.

Each third core 343 includes the depression 35. In this embodiment, in the plane perpendicular to the axial direction, the depression 35 of each third core 343 is formed with three faces and is in a rectangular shape. With this configuration, the depression 35 can be strongly pushed inward in the radial direction with the third jig J3 as shown in the aforementioned steps S4 and S5. Consequently, the roundness of the stator core 31 can be increased.

The stator 3 includes a plurality of teeth 34b including the first tooth 34b and the second tooth 34b. In this case, the angle $\alpha1$ is $360/2n$ degrees, where n represents the number of the plurality of teeth 34b. In this case, the stator 3 is desired to satisfy $\alpha1 \leq \theta1 < 90$ degrees. With this configuration, pushing the first core 341 and the second core 342 inward in the radial direction and in the circumferential direction is facilitated. Accordingly, the roundness of the stator core 31 can be increased.

Since the motor 1 according to the first embodiment includes the stator 3, advantages the same as the above-described advantages of the stator 3 are obtained with the motor 1.

The stator core 31, the coil 32 and the insulator 33 are covered by the resin 9 in the motor 1. Therefore, the first core 341, the second core 342 and the cores 343 are covered by the resin 9. In this case, each depression 35 is desired to be filled in with the resin 9. This can increase the rigidity of the stator core 31. Consequently, the noise during the driving by the motor 1 can be reduced.

Second Embodiment

Figure 14:
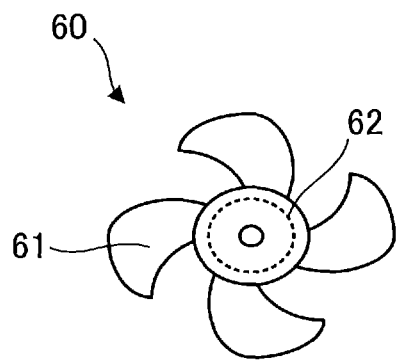
FIG. 14 is a diagram schematically showing the structure of a fan according to a second embodiment of the present invention.

FIG. 14 is a diagram schematically showing the structure of a fan 60 according to a second embodiment of the present invention.

The fan 60 includes a blade 61 and a motor 62. The fan 60 is referred to also as a blower. The motor 62 is the motor 1 according to the first embodiment. The blade 61 is fixed to a shaft of the motor 62 (e.g., the shaft 23 in the first embodiment). The motor 62 drives the blade 61. When the motor 62 drives the blade 61, the blade 61 rotates and an airflow is generated. Accordingly, the fan 60 is capable of blowing out air.

With the fan 60 according to the second embodiment, the same advantages as those described in the first embodiment can be obtained since the motor 1 described in the first embodiment is employed for the motor 62. Further, it is possible to reduce noise of the fan 60 and improve the control of the fan 60.

Third Embodiment

An air conditioner 50 (referred to also as a refrigeration air conditioner or a refrigeration cycle apparatus) according to a third embodiment of the present invention will be described below.

Figure 15:
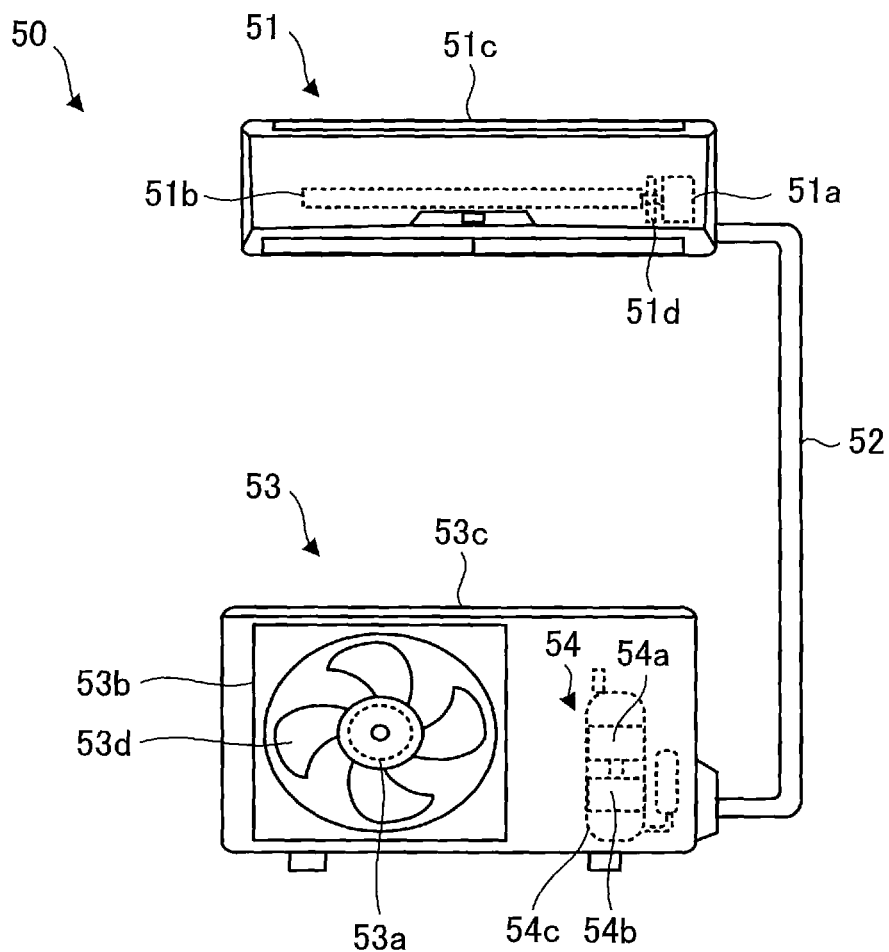
FIG. 15 is a diagram schematically showing the structure of an air conditioner according to a third embodiment.

FIG. 15 is a diagram schematically showing the structure of the air conditioner 50 according to the third embodiment.

The air conditioner 50 according to the third embodiment includes an indoor unit 51 as a blower (first blower), refrigerant piping 52, and an outdoor unit 53 as a blower (second blower) connected to the indoor unit 51 via the refrigerant piping 52.

The indoor unit 51 includes a motor 51a (e.g., the motor 1 according to the first embodiment), a blower unit 51b that is driven by the motor 51a and thereby blows out air, and a housing 51c that covers the motor 51a and the blower unit 51b. The blower unit 51b includes, for example, a blade 51d driven by the motor 51a. For example, the blade 51d is fixed to a shaft of the motor 51a (e.g., the shaft 23) and generates an airflow.

The outdoor unit 53 includes a motor 53a (e.g., the motor 1 according to the first embodiment), a blower unit 53b, a compressor 54, and a heat exchanger (not shown). The blower unit 53b is driven by the motor 53a and thereby blows out air. The blower unit 53b includes, for example, a blade 53d driven by the motor 53a. For example, the blade 53d is fixed to a shaft of the motor 53a (e.g., the shaft 23) and generates an airflow. The compressor 54 includes a motor 54a (e.g., the motor 1 according to the first embodiment), a compression mechanism 54b (e.g., refrigerant circuit) driven by the motor 54a, and a housing 54c that covers the motor 54a and the compression mechanism 54b.

In the air conditioner 50, at least one of the indoor unit 51 or the outdoor unit 53 includes the motor 1 described in the first embodiment. Specifically, the motor 1 described in the first embodiment is employed for at least one of the motor 51a or the motor 53a as a drive source for the blower unit. Further, it is also possible to employ the motor 1 described in the first embodiment as the motor 54a of the compressor 54.

The air conditioner 50 is capable of performing a cooling operation of blowing out cool air from the indoor unit 51, a heating operation of blowing out warm air, or the like, for example. In the indoor unit 51, the motor 51a is a drive source for driving the blower unit 51b. The blower unit 51b is capable of blowing out conditioned air.

With the air conditioner 50 according to the third embodiment, the same advantages as those described in the first embodiment can be obtained since the motor 1 described in the first embodiment is employed for at least one of the motor 51a or the motor 53a. Further, efficiency of the air conditioner 50 can be improved.

Further, by using the motor 1 according to the first embodiment as the drive source of a blower (e.g., the indoor unit 51), the same advantages as those described in the first embodiment can be obtained. Accordingly, efficiency of the blower can be improved. A blower including the motor 1 according to the first embodiment and a blade (e.g., the blade 51d or 53d) driven by the motor 1 can be used independently as a device for blowing out air. This blower can be employed also for equipment other than an air conditioner 50.

Furthermore, by using the motor 1 according to the first embodiment as the drive source of the compressor 54, the same advantages as those described in the first embodiment can be obtained. Further, efficiency of the compressor 54 can be improved.

The motor 1 described in the first embodiment can be mounted not only on an air conditioner 50 but also on equipment having a drive source, such as a ventilating fan, a household electrical appliance and a machine tool.

Features in the embodiments described above can be appropriately combined with each other.

What is claimed is:

1. A stator comprising:
   a first core that includes a first tooth extending in a first radial direction and a first core back extending in a circumferential direction; and
   a second core that includes a second tooth extending in a second radial direction and a second core back extending in the circumferential direction and connects with the first core, wherein
   the first core back includes:
   a depression formed with at least a first face and a second face in an outer peripheral surface of the first core back; and
   a connection part facing the second core back,
   the stator satisfies $\theta 1 < \theta 2$ and $\alpha 1 \leq \theta 1 < 90$ degrees where
   $\theta 1$ represents an angle between the first face and the first radial direction in a plane perpendicular to an axial direction,
   $\theta 2$ represents an angle between the second face and the first radial direction in the plane, and
   $\alpha 1$ (degrees) represents an angle between the connection part and the first radial direction in the plane, and
   the second face of the depression is formed at a position where a straight line passes through a center of the first tooth in the first radial direction in the plane.

2. The stator according to claim 1, wherein
   the stator comprises a plurality of teeth including the first tooth and the second tooth, and
   the angle $\alpha 1$ is $360/2n$ degrees, where n represents the number of the plurality of teeth.

3. The stator according to claim 1, wherein
   the second core back includes a depression formed with at least two faces.

4. The stator according to claim 1, wherein
   an angle between the first face and the second face is 90 degrees in the plane.

5. The stator according to claim 1, wherein
   in the plane, an intersection point of an extension line of the first face and an extension line of the second face is deviated from a center of the first tooth in a direction perpendicular to the first radial direction.

6. The stator according to claim 1, further comprising
   a third core that includes a third tooth extending in a third radial direction and a third core back extending in the circumferential direction and connects with at least one of the first core or the second core, wherein
   the third core includes a depression formed with at least three faces in an outer peripheral surface of the third core back.

7. A motor comprising:
   the stator according to claim 1; and
   a rotor rotatably disposed inside the stator.

8. The motor according to claim 7, wherein
   the first core and the second core are covered by a resin formed of a nonmagnetic material.

9. The motor according to claim 8, wherein
the depression formed in the outer peripheral surface of the first core back is filled in with the resin.

10. A fan comprising:
a blade; and
the motor according to claim 7 that drives the blade.

11. An air conditioner comprising:
an indoor unit; and
an outdoor unit connected to the indoor unit, wherein
at least one of the indoor unit or the outdoor unit includes the motor according to claim 7.

* * * * *